(12) United States Patent
Ohnishi et al.

(10) Patent No.: US 9,175,739 B2
(45) Date of Patent: Nov. 3, 2015

(54) ENGINE MOUNT AND POWER UNIT VIBRATION DAMPING SUPPORT STRUCTURE

(71) Applicants: SUMITOMO RIKO COMPANY LIMITED, Komaki, Aichi (JP); TOYOTA JIDOSHA KABUSHIKI KAISHA, Toyota-shi, Aichi (JP)

(72) Inventors: Masahiro Ohnishi, Ichinomiya (JP); Akio Saiki, Komaki (JP); Takayoshi Yasuda, Kitanagoya (JP); Hiroyuki Ichikawa, Kani (JP); Nobuya Yoshida, Toyota (JP); Hiroshi Miya, Nagakute (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/252,167

(22) Filed: Apr. 14, 2014

(65) Prior Publication Data

US 2014/0367547 A1     Dec. 18, 2014

(30) Foreign Application Priority Data

Jun. 17, 2013   (JP) .................................. 2013-126275

(51) Int. Cl.
  *F16M 13/00*   (2006.01)
  *F16M 1/00*   (2006.01)
  (Continued)

(52) U.S. Cl.
  CPC ... *F16F 1/36* (2013.01); *B60K 5/12* (2013.01); *B60K 5/1216* (2013.01); *B60K 5/1225* (2013.01); *F16F 15/08* (2013.01)

(58) Field of Classification Search
  CPC .......... B60K 5/1208; B60K 5/04; B60K 5/12; B60K 5/1216; B60K 5/1225; F16F 1/36; F16F 15/08
  See application file for complete search history.

(56) References Cited

U.S. PATENT DOCUMENTS

| | | | |
|---|---|---|---|
| 4,564,082 A * | 1/1986 | Takehara et al. | 180/312 |
| 7,562,737 B2 * | 7/2009 | Miyahara et al. | 180/291 |

(Continued)

FOREIGN PATENT DOCUMENTS

| | | |
|---|---|---|
| EP | 1852631 A1 | 11/2007 |
| JP | A-58-161617 | 9/1983 |

(Continued)

OTHER PUBLICATIONS

Apr. 14, 2015 Office Action issued in Japanese Application No. 2013-126275.

*Primary Examiner* — Amy Sterling
(74) *Attorney, Agent, or Firm* — Oliff PLC

(57) ABSTRACT

An engine mount for use in a power unit vibration damping support structure configured to be mounted on a transmission side in a state without a distributed support load of a weight of the power unit being applied, the engine mount including: an inner shaft member; an outer tube member arranged separated to an outer circumference side of the inner shaft member; and a main rubber elastic body fixed to the inner shaft member while being attached to the outer tube member non-adhesively such that the inner shaft member and the outer tube member are elastically connected by the main rubber elastic body, wherein the outer tube member is configured to be attached to the power unit, and the inner shaft member is configured to be attached to a vehicle body.

3 Claims, 8 Drawing Sheets

(51) Int. Cl.
  *F16F 1/36* (2006.01)
  *F16F 15/08* (2006.01)
  *B60K 5/12* (2006.01)

(56) References Cited

U.S. PATENT DOCUMENTS

| 7,575,087 | B2 | 8/2009 | Kim |
| 8,567,771 | B2 * | 10/2013 | Kappich et al. .......... 267/140.11 |
| 2006/0144631 | A1 | 7/2006 | Kim |

FOREIGN PATENT DOCUMENTS

| JP | A-58-202110 | 11/1983 |
| JP | A-2001-97050 | 4/2001 |
| JP | B2-3693834 | 9/2005 |
| JP | 2006176109 A | 7/2006 |
| JP | 2006234046 A | 9/2006 |
| JP | A-2006-300314 | 11/2006 |
| JP | 2009108935 A | 5/2009 |
| JP | A-2010-196719 | 9/2010 |

* cited by examiner

● : 1W SUPPORT MOUNT
○ : 1W NON-SUPPORT MOUNT

FIG.9
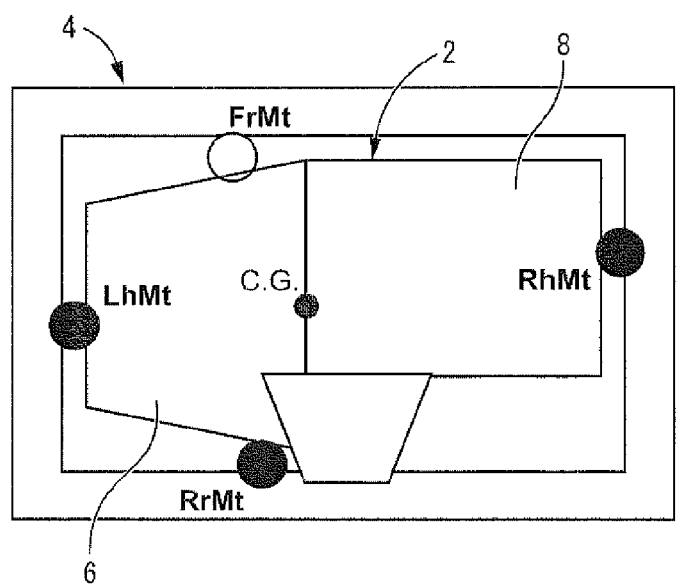
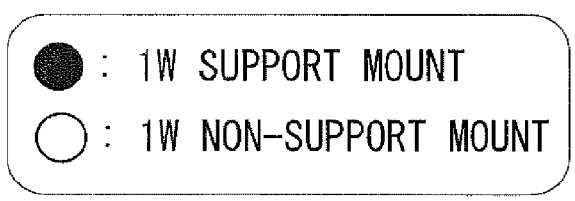
PRIOR ART ic mount on a vehicle body, and particularly to an engine mount and a power unit vibration damping support structure of a suitable and novel structure that gives vibration damping support to a transverse engine type power unit on a vehicle body at four points: front, rear, left, and right.

2. Description of the Related Art

With automobiles, in order to give stable support while reducing vibration transmission to the vehicle body, a power unit integrally constituted with an engine, transmission unit and the like has vibration damping support on the vehicle body at a plurality of locations via an engine mount. In particular, as one type of power unit support structure for a transverse engine type with the crank shaft arranged in the vehicle horizontal direction, from the past, there have been proposals for structures that give vibration damping support to the power unit on the vehicle body via respective engine mounts at four points including front, rear, left and right of the vehicle, as noted for example in Japanese Unexamined Patent Publication No. JP-A-2001-097050.

With this conventional four point support structure, as shown in FIG. 9, typically, a power unit 2 is made to have vibration damping support in relation to a sub frame 4 as the vehicle body comprising a front side member, front cross member and the like with a total of four engine mounts including the mounts LhMt and RhMt arranged at the left and right sides of the vehicle, and the mounts FrMt and RrMt arranged at the front and rear sides of the vehicle. Then, with a total of three mounts including the mounts LhMt and RhMt at the left and right sides and the mount RrMt at one of the front/rear sides arranged surrounding the center of gravity C.G. of the power unit 2, the static load of the power unit 2 is given distributed support, and torque roll reaction force or the like is received by the mount FrMt at the other of the front/rear sides.

Meanwhile, with this kind of four point support structure for a power unit, each engine mount needs to be arranged in a limited space, and particularly, the mounting space for the engine mounts LhMt and RhMt mounted at the left and right sides are unavoidably restricted depending on the vehicle width dimensions. Moreover, among these, taking into consideration the tilt of the principal axis of inertia, the engine mount LhMt mounted at the transmission 6 side in one of the left-right sides is mounted lower than the engine mount RhMt mounted on the engine 8 side in the other of the left-right sides, so that the mounting space is even more restricted. Therefore, with the engine mount LhMt mounted on the transmission 6 side in one of the left-right sides, there is a great deal of demand for more compact size.

However, when that engine mount LhMt is made more compact, due to things such as the volume of the rubber elastic body constituting the engine mount becoming smaller, there was a problem that it became difficult to realize both the required durability and low spring characteristics.

SUMMARY OF THE INVENTION

It is therefore one object of this invention to provide an engine mount and a power unit vibration damping support structure of a novel structure which makes it possible, when doing vibration damping support of a transverse engine type power unit on a vehicle body at four points of front, rear, left and right, to give both durability and low spring characteristics to the engine mount mounted at the transmission side in the left-right direction of the vehicle while being more compact.

The above and/or optional objects of this invention may be attained according to at least one of the following modes of the invention. The following modes and/or elements employed in each mode of the invention may be adopted at any possible optional combinations.

The first mode of the present invention provides an engine mount for use in a power unit vibration damping support structure that gives vibration damping support to a transverse engine type power unit including an engine and transmission on a vehicle body via four engine mounts at four respective points including front, rear, left and right of a vehicle, wherein a weight of the power unit is distributed and supported by two of the four engine mounts arranged at the front and rear of the vehicle, and one of the four engine mounts mounted on an engine side arranged at one of the left and right of the vehicle, the engine mount configured to be used as a last one of the four engine mounts mounted on a transmission side arranged at another of the left and right of the vehicle in a state without a distributed support load of the weight of the power unit being applied, the engine mount comprising: an inner shaft member; an outer tube member arranged separated to an outer circumference side of the inner shaft member; and a main rubber elastic body fixed to the inner shaft member while being attached to the outer tube member non-adhesively such that the inner shaft member and the outer tube member are elastically connected by the main rubber elastic body, wherein the outer tube member is configured to be attached to the power unit, and the inner shaft member is configured to be attached to the vehicle body.

With the engine mount of this mode, by having the main rubber elastic body not be adhered to the outer tube member, the constraining force operation of the outer tube member on the outer circumferential surface of the main rubber elastic body is reduced or avoided. This arrangement permits that the spring characteristics of the main rubber elastic body on the vibration load input between the inner shaft member and the outer shaft member are shifted to low spring level which improves the vibration damping performance. Also, concentration of the stress and distortion generated in the main rubber elastic body during load input is avoided, and by the maximum generated stress and distortion being reduced, it is also possible to achieve an improvement in durability. As a result, while ensuring both low spring characteristics and durability, it is easy to make the rubber volume of the main rubber elastic body lower and to make the engine mount more compact, making it possible to suitably use this as an engine mount mounted on the transmission side.

In fact, with the engine mount of this mode, there is an effective countermeasure even for stick slip which is a concern by not using adhesion for the main rubber elastic body on the outer tube member. Specifically, by not using adhesion for the main rubber elastic body on the outer tube member, along with the occurrence of stick slip which is momentary sliding between the two abutting surfaces during load input, it is also possible there would be transmission to the vehicle body side as vibration or noise.

Here, with the engine mount of this mode, first, the outer tube member, for which there is concern of the occurrence of stick slip between it and the main rubber elastic body, is adhered not to the vehicle body but rather to the power unit. Thus, even if stick slip did occur, the vibration that accompanies the stick slip would be transmitted from the inner shaft member via the main rubber elastic body to the vehicle body, and application of that vibration directly to the vehicle body is prevented. Therefore, even if stick slip occurs, it is possible to effectively prevent the problem of that being transmitted to the vehicle body and becoming noise or vibration within the vehicle.

In addition, with the engine mount of this mode, the engine mount for which there is concern about this stick slip is made to be mounted in a mode without distributed supporting of the power unit weight. Therefore, by the application of pre-compression in the axis-perpendicular direction on the main rubber elastic body, it is possible to press the main rubber elastic body on the outer tube member with a predetermined abutting force, and to avoid one directional abutting force being removed or greatly reduced along with the effect of the distributed support load. Therefore, it is possible to have stable operation of the initial abutting force on the site where the main rubber elastic body and the outer tube member overlap, and it is possible to suppress the occurrence of stick slip itself at that overlapping site.

The second mode of the present invention provides the engine mount according to the first mode, further comprising a fixed position adjustment mechanism that permits to change and adjust an attachment position within a designated range at least at one of an attachment site of the outer tube member to the power unit and an attachment site of the inner shaft member to the vehicle body.

With the engine mount of this mode, when mounting between the power unit and the vehicle body, by adjusting the attachment position at the attachment site of at least one of the outer tube member and the inner shaft member, error of the part dimension or assembly position is absorbed. Thus, it is easy on site to have the initial static distributed support load applied to that engine mount be the 0 value set with the design.

The third mode of the present invention provides a power unit vibration damping support structure that gives vibration damping support to a transverse engine type power unit including an engine and transmission on a vehicle body via four engine mounts at four respective points including front, rear, left and right of a vehicle, wherein a weight of the power unit is distributed and supported by two of the four engine mounts arranged at the front and rear of the vehicle, and one of the four engine mounts mounted on an engine side arranged at one of the left and right of the vehicle, while a last one of the four engine mounts is mounted on a transmission side arranged at another of the left and right of the vehicle in a state without a distributed support load of the weight of the power unit being applied, and the last one of the four engine mounts comprises a tube shaped mount which includes: an inner shaft member; an outer tube member arranged separated to an outer circumference side of the inner shaft member; and a main rubber elastic body attached to the outer tube member non-adhesively such that the inner shaft member and the outer tube member are elastically connected by the main rubber elastic body, wherein the outer tube member is attached to the power unit, and the inner shaft member is attached to the vehicle body.

With the power unit vibration damping support structure of the structure according to this mode, a tube shaped vibration damping device of a special structure for which the main rubber elastic body is not adhered to the outer tube member is used as the engine mount mounted to the transmission side, and also a special mounting mode of attaching the outer tube member to the power unit side is used, while the initial distributed support load for the design is set to 0 for that engine mount. By so doing, with the transmission side engine mount for which mounting space is limited, it is possible to ensure both low spring characteristics and durability while also making the size more compact, thereby effectively avoiding the problem of vibration and noise due to stick slip.

The fourth mode of the present invention provides the power unit vibration damping support structure according to the third mode, wherein each of the two engine mounts arranged at the left and right of the vehicle has a separation distance in relation to a principal axis of inertia of the power unit that is smaller than those of the two engine mounts arranged at the front and rear of the vehicle.

With the power unit vibration damping support structure of this mode, the torque reaction force is effectively supported by the engine mount arranged at the vehicle front and rear, and in particular the torque reaction force input to the engine mount mounted on the transmission side at one of the vehicle left and right sides or the volume that the power unit can oscillate are reduced. By doing this, the input load to the transmission side engine mount for which the mounting space is limited is decreased, and it is possible to achieve the effects of further compactness and improvements in durability, as well as suppression of stick slip.

The fifth mode of the present invention provides the power unit vibration damping support structure according to the third or fourth mode, wherein a total of the distributed support load of the power unit on the two engine mounts arranged at the front and rear of the vehicle is greater than a half of an overall support load of that power unit.

With the power unit vibration damping support structure of this mode, the same as with the engine mount mounted on the transmission side arranged at one of the left and right sides of the power unit, even with an engine mount mounted on the engine side arranged at the other side of the left and right sides of the power unit which tends to be tightly restricted depending on the vehicle width dimension, by reducing the distributed support load of the power unit, it is possible to ensure the required vibration damping performance, durability and the like while also being more compact.

According to the present invention, with an engine mount which tends to be tightly restricted in terms of mounting space due to the restricted vehicle width dimension by being mounted on the transmission side at one of the left and right sides of the power unit, by using a tube type vibration damping device of a special structure, employing a special mounting mode on the power unit, and setting a special distributed support load with the design, it is possible to ensure both low spring characteristics and durability, and to make the size more compact, and it is possible to effectively avoid the problem of vibration and noise due to stick slip.

Specifically, using the present invention which can achieve this kind of novel technical working effect, when doing vibration damping support of a transverse engine type power unit on a vehicle body at four points including front, rear, left and right, it is possible to provide an engine mount and a power unit vibration damping support structure of a novel structure which makes it possible to establish both durability and low spring characteristics with the engine mount mounted on the transmission side in the vehicle left and right directions and also to make the size more compact.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 9 is a specific plan view showing a power unit support structure as a prior art example.

DETAILED DESCRIPTION OF PREFERRED EMBODIMENTS

Figure 1A:
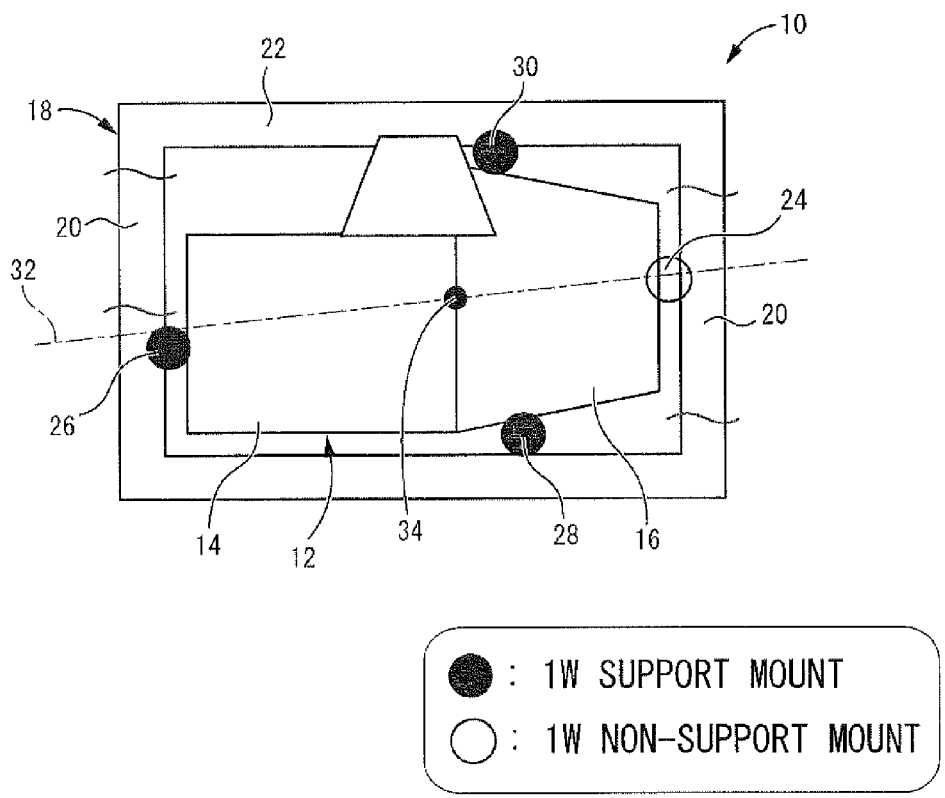
FIGS. 1A and 1B are specific views suitable for explaining a power unit vibration damping support structure as an embodiment of the present invention, with FIG. 1A being a plan view, and FIG. 1B being a front view.

Following, to make the present invention even more clear with specifics, we will give a detailed description of embodiments of the present invention while referring to the drawings.

Figure 1B:
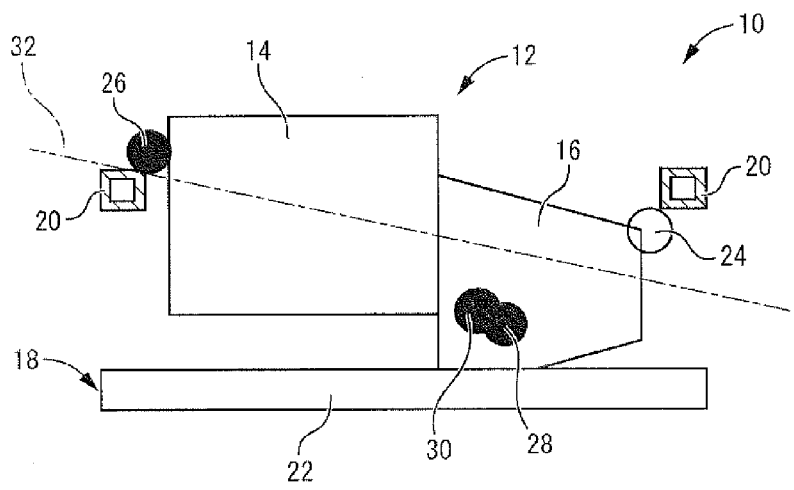

First, in FIGS. 1A and 1B, a power unit vibration damping support structure 10 as an embodiment of the present invention is shown in model form as a plan view in FIG. 1A and a front view in FIG. 1B. A power unit 12 of this power unit vibration damping support structure 10 is an FF type automobile power unit, and is constituted including a unit structure engine 14 which is an internal combustion engine and a unit structure transmission 16 which is a gear box. Then, using this power unit 12, the rotational drive force generated by the engine 14 is adjusted to the output and torque required for the vehicle to move by the gear train of the transmission 16, and is transmitted from the output shaft to the drive wheel side propeller shaft.

In more detail, the power unit 12 is installed in horizontally long form in a state with the engine 14 and the transmission 16 serially linked in the vehicle left and right direction so that the crank shaft of the engine 14 is in the vehicle left and right direction (left and right direction in FIG. 1), and is arranged placed horizontally in relation to a vehicle body 18. With this embodiment, as the vehicle body 18, a front sub frame is used that is constituted by top side front upper members 20, 20 comprising a pair of side members arranged with a designated distance separated in the vehicle left and right direction, and a bottom side front lower member 22 having an overall rectangular frame shape. However, for example it is also possible to have a monocoque structure for the vehicle body itself, or to have a sub frame that is fixed or linked with vibration damping to the vehicle body itself.

Then, the power unit 12 has vibration damping support on the vehicle body 18 via a total of four engine mounts, the left and right engine mounts 24 and 26 arranged at the vehicle left and right sides, and the engine mounts 28 and 30 arranged at the vehicle front and rear sides in relation to the power unit 12. With this embodiment, while the left engine mount (left mount) 24 is mounted on the transmission 16 side, the right engine mount (right mount) 26 is mounted on the engine 14 side.

Also, while the left and right engine mounts 24 and 26 are both arranged at a nearby position in relation to a principal axis of inertia 32 of the power unit 12, the front engine mount (front mount) 28 and the rear engine mount (rear mount) 30 are positioned sandwiching the principal axis of inertia 32 at both the front and rear sides, as well as below the principal axis of inertia 32, and arranged at a position at a relatively large distance from the principal axis of inertia 32. As shown by example in FIGS. 1A and 1B, the principal axis of inertia 32 of the power unit 12 is typically a straight line extending at a downward tilt toward the transmission 16 side from the engine 14 side through a center of gravity 34 of the power unit 12.

Furthermore, the center of gravity 34 of the power unit 12 is positioned at the center of a triangle connected by the right mount 26, and the front and rear mounts 28 and 30, and the entire static weight of the power unit 12 has distributed support by these three mounts 26, 28, and 30. Then, with the left mount 24, the initial setting is made such that the distributed support load of the power unit 12 is 0. Specifically, in a standing state with the automobile engine stopped, setting is done such that the input load to the left mount 24 is 0.

In particular with this embodiment, the majority of the support load of the power unit 12 is distributed jointly with the front and rear mounts 28 and 30, and optimally, the distributed support load by the front and rear mounts 28 and 30 is set to be 60 to 80% of the entirety. By doing this, the distributed support load of the power unit 12 on the right mount 26 is less than 50% of the entirety, and it is easy to make the mounts more compact.

Thus, as the right mount 26 and the front and rear mounts 28 and 30 described above, for example as noted in JP-A-2001-097050, the engine mounts used with the conventional well-known power unit support structure using four point support are suitably used taking into consideration not only the static distributed support load that is input but also the input load size and the like of dynamic vibration load, torque roll reaction force and the like. In specific terms, for example in addition to the rubber mount noted in JP-A-2001-097050 or in Japanese Unexamined Patent Publication No. JP-A-58-161617, it is also possible to suitably use the fluid filled mount or the like noted in Japanese Unexamined Patent Publication No. JP-A-2006-300314 or Japanese Unexamined Patent Publication No. JP-A-2010-196719.

Meanwhile, with the left mount 24, it is arranged not to bear the distributed load of the power unit 12, and also to be near the principal axis of inertia 32, and the input torque roll reaction force is also kept small. Thus, as described in detail hereafter, a special structure engine mount is used as this left mount 24.

Figure 2:
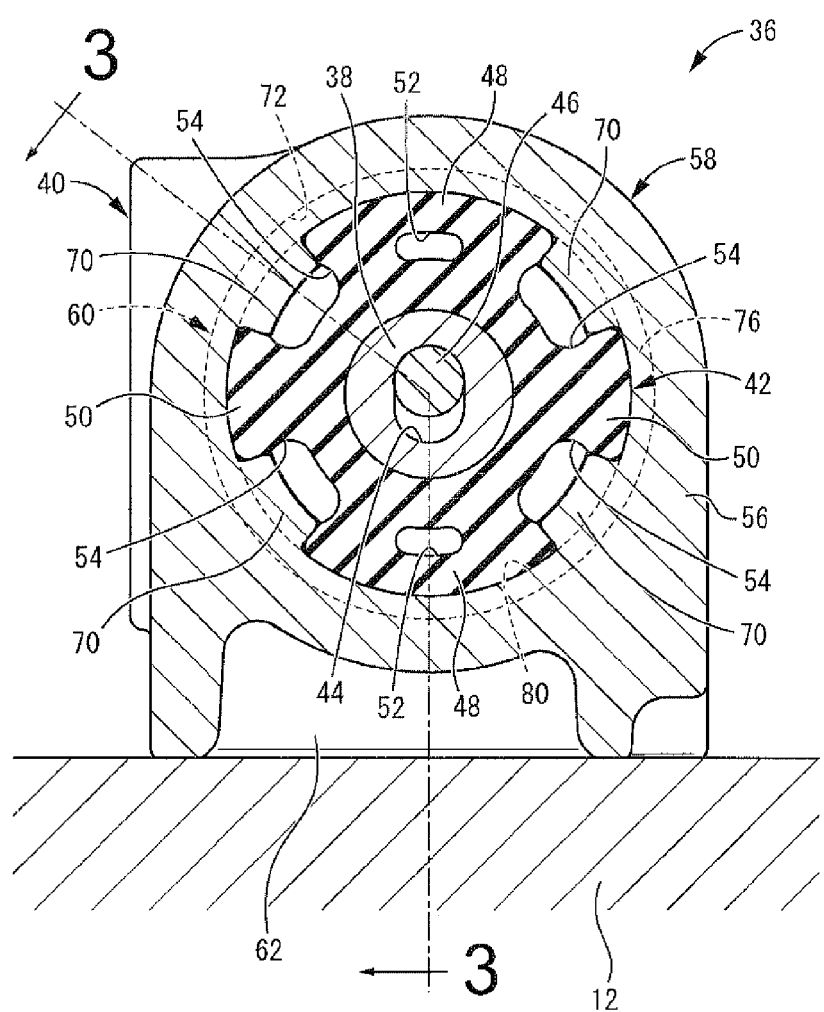
FIG. 2 is a transverse cross sectional view as an embodiment of an engine mount constituting the power unit vibration damping support structure shown in FIGS. 1A and 1B, which correlates to cross section taken along line 2-2 of FIG. 3.
Figure 3:
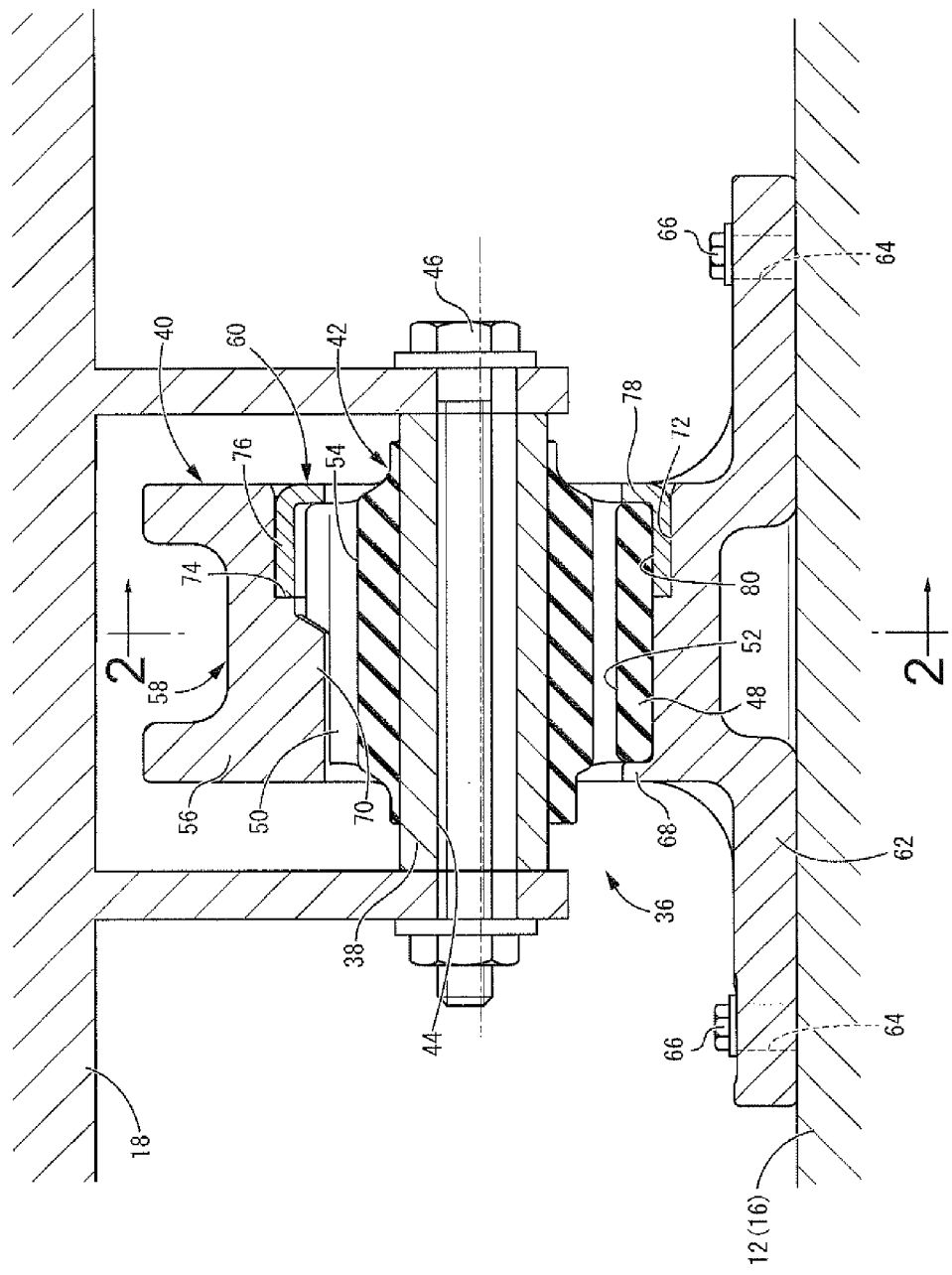
FIG. 3 is a cross sectional view taken along line 3-3 of FIG. 2.

In FIGS. 2 and 3, an engine mount 36 is shown as an embodiment of the present invention that can be suitably used as this left mount 24. This engine mount 36 is a tube shaped mount for which an inner shaft member 38 and an outer tube member 40 arranged separated to the outer circumference are elastically connected by a main rubber elastic body 42. With the description hereafter, as a general rule, the vertical direction means the vertical direction in FIG. 2 which becomes the roughly vertical direction in the vehicle mounted state, and the left-right direction means the left-right direction in FIG. 2 which is the roughly left-right direction of the vehicle. Furthermore, the front-rear direction means the center axis direction of the inner shaft member 38 which is the vertical direction in FIG. 3 which is the roughly front-rear direction of the vehicle.

In more specific detail, the inner shaft member 38 is constituted as a straight tube metal fitting, and an inner hole 44 extending in its center shaft has a long-hole cross-section shape in the vehicle vertical direction with the engine mount 36 mounted. Then, the inner shaft member 38 is made to be fixed to the vehicle body 18 by a fixing bolt 46 inserted through this inner hole 44. In this way, by the inner hole 44 having a long-hole cross-section shape, it is possible to adjust the attachment position of the inner shaft member 38 to the vehicle body 18. Specifically, with this embodiment, at the attachment site of the inner shaft member 38 and the vehicle body 18, a fixed position adjustment mechanism is provided that makes it possible to change and adjust that attachment position within a designated range.

Figure 4:
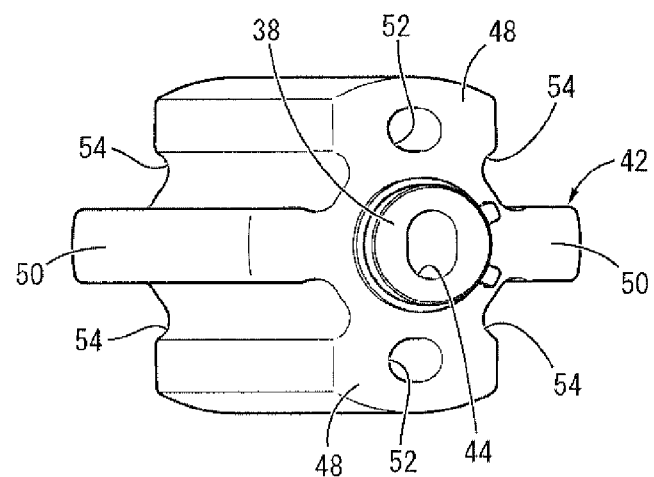
FIG. 4 is a perspective view showing an integrally vulcanization molded component of a main rubber elastic body constituting the engine mount shown in FIG. 2.
Figure 5:
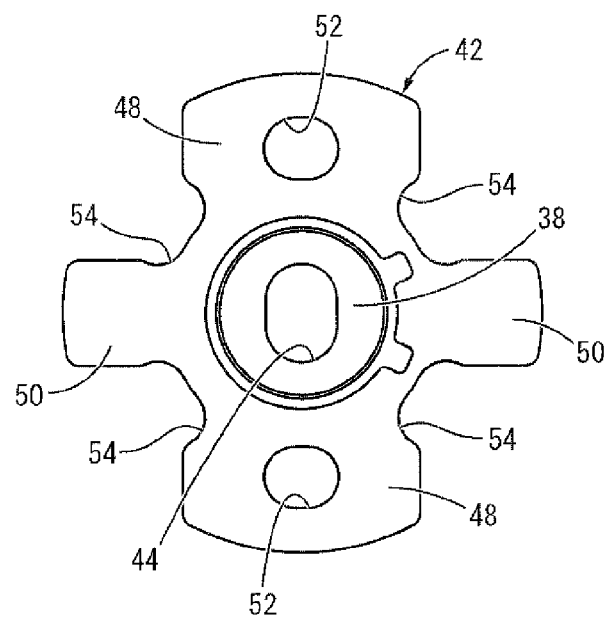
FIG. 5 is a front view of the integrally vulcanization molded component of the main rubber elastic body shown in FIG. 4.

Furthermore, the main rubber elastic body 42 is bonded by vulcanization or the like on the round tube shaped outer circumferential surface of this inner shaft member 38. As shown in FIGS. 4 and 5, this main rubber elastic body 42 is integrally equipped with a pair of first rubber arms 48, 48 projecting to the top and bottom sides from the inner shaft member 38, and a pair of second rubber arms 50, 50 projecting to the left and right sides from the inner shaft member 38, and has a roughly plus sign shape with the axial direction view. The circumferential direction thickness of the first rubber arms 48 is greater than that of the second rubber arms 50, and a through hole 52 is formed piercing through roughly the center part of the first rubber arms 48 in the axial direction, and spring characteristics are adjusted.

Also, on the main rubber elastic body 42, locking grooves 54 are respectively provided positioned between the first rubber arms 48 and the second rubber arms 50 adjacent in the circumferential direction. The locking grooves 54 are concave grooves extending along the entire length of the main rubber elastic body 42 in the axial direction, and open at the outer circumferential surface of the main rubber elastic body 42. Furthermore, the locking grooves 54 expand gradually in the circumferential direction facing the outer circumference side.

Figure 6:
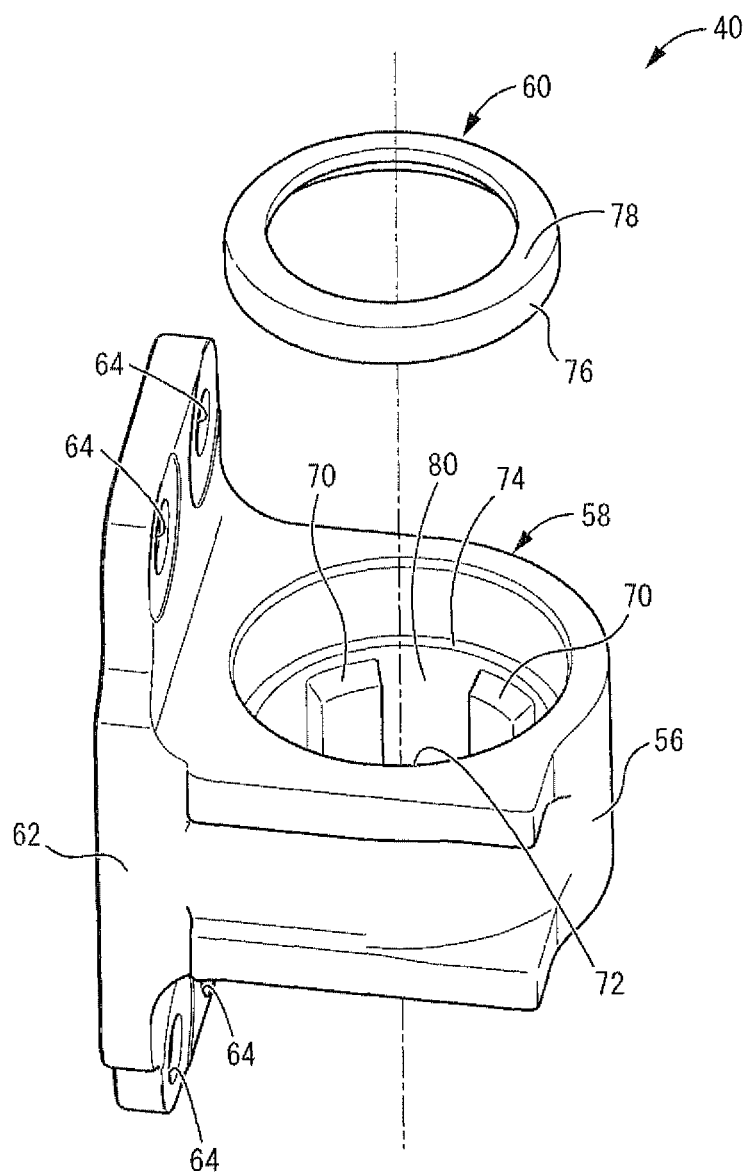
FIG. 6 is an exploded perspective view showing an outer tube member constituting the engine mount shown in FIG. 2.
Figure 7:
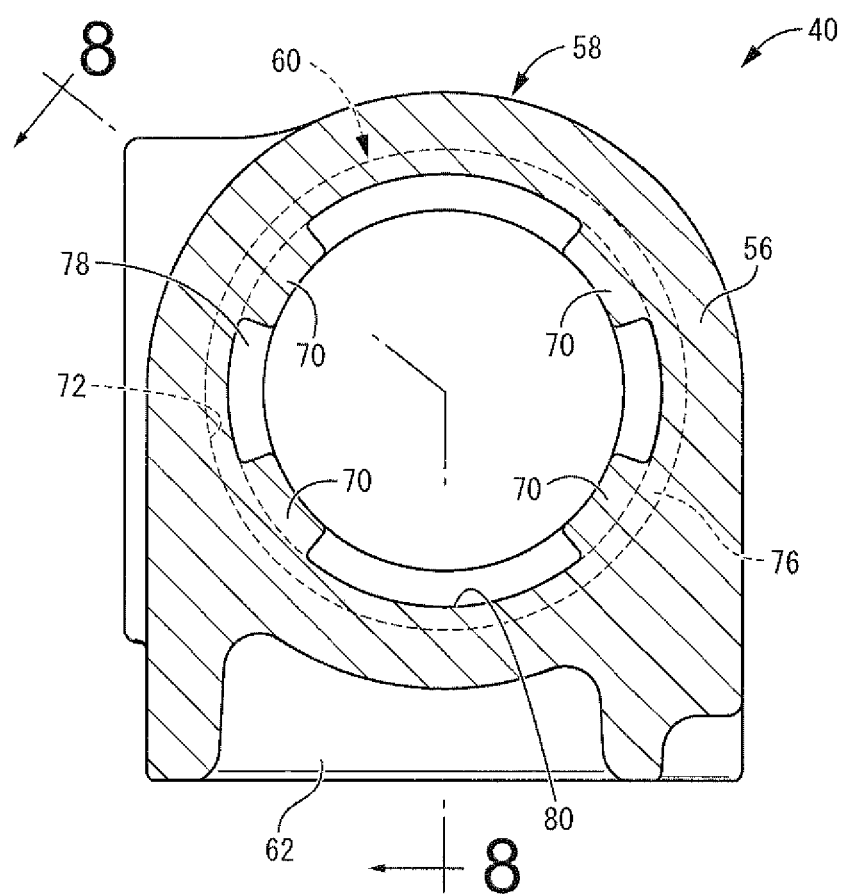
FIG. 7 is a vertical cross sectional view showing the outer tube member shown in FIG. 5, which correlates to cross section taken along line 7-7 of FIG. 8.
Figure 8:
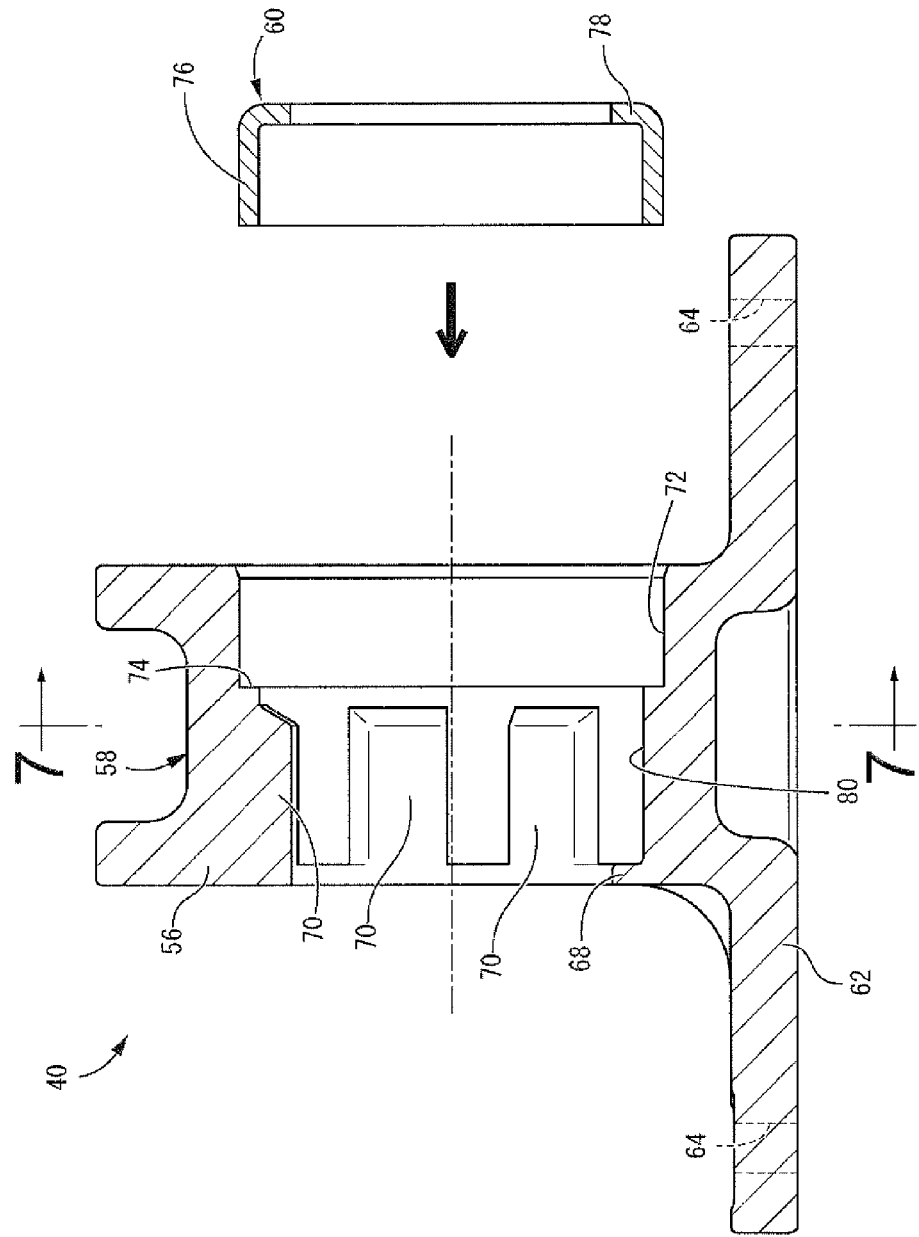
FIG. 8 is a cross sectional view taken along line 8-8 of FIG. 7.

Meanwhile, as shown in FIGS. 6 to 8, the outer tube member 40 is made to constitute the attachment part of the main rubber elastic body 42 by a fixing metal fitting 60 being adhered by press fitting or the like to a tube shaped part 58 of a main unit metal fitting 56. Also, a fixing plate part 62 is provided that integrally broadens from the outer circumferential surface of the tube shaped part 58, and the outer tube member 40 is fixed to the transmission 16 of the power unit 12 by a plurality of fixing bolts 66 inserted through a plurality of insertion holes 64 provided on this fixing plate part 62.

A ring shaped abutting protruding part 68 projecting toward the inner circumference side from the opening edge part is integrally formed on one axial end of the tube shaped part 58. Also, four locking projections 70, 70, 70, and 70 project from the inner circumference surface of the tube shaped part 58 so as to be separated by a designated distance from one another in the circumferential direction. Each of the locking projections 70 extends continuously in the axial direction from the abutting protruding part 68 of the one axial end side of the tube shaped part 58 until the middle position which does not reach the other axial end side thereof. Each of the locking projections 70 has the width in the circumferential direction gradually become smaller facing toward the projecting tip.

Also, with the other axial end of the tube shaped part 58, the axial end for which the locking projection 70 is not provided comprises a large diameter part 72 for which the opening inner circumferential surface increases in diameter. This large diameter part 72 is positioned further to the axially outside than the other axial end of the locking projection 70, and a step part 74 is formed on the inner circumferential surface of the tube shaped part 58 between the formation zone of the locking projection 70 and the formation zone of the large diameter part 72.

Then, the outer tube member 40 is constituted by the fixing metal fitting 60 being attached to the large diameter part 72 at the tube shaped part 58 of the main unit metal fitting 56. Also, on the fixing metal fitting 60, a retaining protruding part 78 is integrally formed in an annular disk shape projecting to the inner circumference side from one axial opening edge part of a round tube shaped attachment tube 76. With the fixing metal fitting 60 attached to the main unit metal fitting 56, this retaining protruding part 78 is made to project radially inward at the axial opening end edge part of the tube shaped part 58.

Furthermore, before or roughly simultaneously with attachment of this fixing metal fitting 60 to the main unit metal fitting 56, the above-described main rubber elastic body 42 to which the inner shaft member 38 is attached is fit and inserted for attachment to the tube shaped part 58 of the fixing metal fitting 60. Then, by attaching the fixing metal fitting 60 to the main unit metal fitting 56, simultaneous with formation of the outer tube member 40, the main rubber elastic body 42 is attached to the outer tube member 40, and the engine mount 36 is folified.

With this engine mount 36, a tube shaped inner circumferential surface 80 formed in cooperation with the tube shaped part 58 and the fixing metal fitting 60 on the outer tube member 40 is overlapped and attached in an abutting state in relation to each outer circumferential surface of the first rubber arms 48, 48 and the second rubber arms 50, 50 on the main rubber elastic body 42, and the outer tube member 40 is attached non-adhesively to the outer circumferential surface of the main rubber elastic body 42.

Also, with the projecting tip part to each outer circumference side of the first rubber arms 48, 48 and the second rubber arms 50, 50 which constitute the outer circumference part of the main rubber elastic body 42, two axial end surfaces are overlapped in an abutting state respectively to the abutting protruding part 68 of the main unit metal fitting 56 and the retaining protruding part 78 of the fixing metal fitting 60, and are held axially between the abutting protruding part 68 and the retaining protruding part 78. By doing this, falling out in the axial direction of the integrally vulcanization molded component of the inner shaft member 38 and the main rubber elastic body 42 in relation to the main unit metal fitting 56 is prevented, and also, the tip parts of the first and second rubber arms 48 and 50 are pre-compressed in the axial direction and strongly attached.

Furthermore, the locking projections 70 of the outer tube member 40 are fitted into the respective locking grooves 54 of the main rubber elastic body 42, and each tip part of the first and second rubber arms 48 and 50 are pre-compressed in the circumferential direction. Additionally, each tip part of the first and second rubber arms 48 and 50 in the main rubber elastic body 42 is pre-compressed in the axial direction by being grasped between the axially opposed surfaces of the abutting protruding part 68 of the main unit metal fitting 56 and the retaining protruding part 78 of the fixing metal fitting 60.

Specifically, with the main rubber elastic body 42 fit into the outer tube member 40, the first and second rubber arms 48 and 50 can be pre-compressed in the axial direction between the inner shaft member 38 and the outer tube member 40, and additionally, the tip parts of those first and second rubber arms 48 and 50 can also be constrained in the axial direction and the circumferential direction and be pre-compressed. With the main rubber elastic body 42, at the axially middle part of the first and second rubber arms 48 and 50, by allowing elastic deformation with ensuring of a free surface toward the bottom side and the axially opposite sides of each locking groove 54 as well as toward the inner circumference side of the through hole 52, it is possible to give the designated spring characteristics.

By attaching the main rubber elastic body 42 to the outer tube member 40 in this kind of pre-compressed state for the first and second rubber arms 48 and 50, the outer circumferential surface of the main rubber elastic body 42 is stably and strongly attached to the inner circumferential surface of the outer tube member 40 even without adhesion, and stable vibration damping performance can be exhibited during input of a vibration load.

Then, as described above, by the inner shaft member 38 being attached to the vehicle body 18 while the outer tube member 40 being attached to the power unit 12, the vehicle body 18 and the power unit 12 are elastically connected by the main rubber elastic body 42. When attaching the engine mount 36 to the vehicle, it is mounted in a state with the center shaft of the inner shaft member 38 extending in roughly the front-rear direction of the vehicle.

Thus, the power unit vibration damping support structure 10 employs the engine mount 36 of the structure described above as the left mount 24, and is constituted in cooperation with the front and rear mounts 28 and 30 and the right mount 26 as described previously. With that left mount 24, since the main rubber elastic body 42 is not adhered to the outer tube member 40, it is possible to reduce the constraint force operation by the outer tube member 40 on the outer circumferential part of the main rubber elastic body 42. Therefore, with the left mount for which the installation space tends to be greatly restricted because of being placed below to support the transmission 16 side in the vehicle width direction, input of a static distributed support load is avoided, and also, it is possible to keep to a low level the stress and distortion that occurs with the main rubber elastic body 42 during dynamic load input such as vibration or the like. By so doing, while ensuring both low spring characteristics and durability, it is easy to make the rubber volume of the main rubber elastic body 42 small and to make the engine mount more compact.

In fact, with the left mount 24, since a static distributed support load is not applied, it is possible to effectively and stably maintain the abutting force of the main rubber elastic body 42 and the outer tube member 40 preset with pre-compression or the like in the axis-perpendicular direction. As a result, the occurrence of stick slip at the non-adhered abutting surface of the main rubber elastic body 42 and the outer tube member 40 can also be effectively prevented.

Also, even if this stick slip does occur, since the outer tube member 40 of the left mount 24 is attached to the power unit 12 side, the vibration due to the stick slip that occurred is transmitted to the vehicle body 18 side from the inner shaft member 38 via the main rubber elastic body 42. Therefore, the vibration damping performance of the main rubber elastic body 42 arranged on that transmission path is effectively exhibited, so that transmission of the vibration due to stick slip to the vehicle body 18 side is suppressed, and occurrence of noise or vibration which are problems inside the vehicle are effectively prevented.

An embodiment of the present invention has been described in detail above, but the present invention is not limited to those specific descriptions. In particular, the specific constitution of the left mount 24 is not to be interpreted as being limited by the embodiment noted above, and for example instead of using the fixing metal fitting 60 noted above, it is also possible to do caulking processing of the axial opening end edge part of the outer tube member so as to integrally provide the retaining protruding part in an internal flange shape projecting inwardly.

Also the specific shape of the main rubber elastic body is suitably set according to the required vibration damping performance. In addition to the main rubber elastic body 42 having a plus mark structure having the first and second rubber arms 48 and 50 as described previously, for example it is also possible to use a structure which employs a main rubber elastic body of a thick cylinder shape, or a main rubber elastic body or the like comprising a pair of rubber arms extending toward both sides sandwiching the inner shaft member 38, and has the outer circumferential surface thereof attached non-adhesively to the outer tube member 40.

Furthermore, with the embodiment noted above, by the inner hole 44 of the inner shaft member 38 being a long-hole cross-section shape, it was possible to adjust the attachment position of the inner shaft member 38 to the vehicle body 18. Similarly, by having the insertion hole 64 of the outer tube member 40 be a long-hole shape, it is also possible to make the attachment position of the outer tube member 40 to the power unit 12 adjustable within a designated range. In particular, in that case, the longitudinal direction of both holes 44 and 64 are set in a direction roughly orthogonal, and it is preferable to make the attachment position of the inner shaft member 38 to the vehicle body 18 and the attachment position of the outer tube member 40 to the power unit 12 adjustable in the roughly orthogonal direction. By doing this, when attaching the engine mount 36 to the vehicle, the degree of freedom for the alignment direction is increased.

What is claimed is:

1. A power unit vibration damping support structure that gives vibration damping support to a transverse engine type power unit including an engine and transmission on a vehicle body via four engine mounts at four respective points including front, rear, left and right of a vehicle, the four engine mounts comprising a front engine mount, a rear engine mount, an engine side engine mount and a transmission side engine mount, wherein a weight of the power unit is distributed and supported by the front and rear engine mounts arranged at the front and rear of the vehicle, and the engine side engine mount mounted on an engine side arranged at one of the left and right of the vehicle, while the transmission side engine mount is mounted on a transmission side arranged at another of the left and right of the vehicle in a state without a distributed support load of the weight of the power unit being applied, the transmission side engine mount comprises a tube shaped mount which includes: an inner shaft member; an outer tube member arranged separated to an outer circumference side of the inner shaft member; and a main rubber elastic body attached to the outer tube member non-adhesively such that the inner shaft member and the outer tube member are elastically connected by the main rubber elastic body, wherein the outer tube member is attached to the power unit, and the inner shaft member is attached to the vehicle body, the front and rear engine mounts are both arranged below a principal axis of inertia of the power unit, while the engine side and transmission side engine mounts are both arranged above the principal axis of inertia of the power unit, when viewed in a front-rear direction of the vehicle, and the transmission side engine mount is arranged more largely separated above the principal axis of inertia of the power unit than the engine side engine mount.

2. The power unit vibration damping support structure according to claim 1, wherein each of the engine side and transmission side engine mounts arranged at the left and right of the vehicle has a separation distance in relation to the principal axis of inertia of the power unit that is smaller than those of the front and rear engine mounts arranged at the front and rear of the vehicle.

3. The power unit vibration damping support structure according to claim 1, wherein a total of the distributed support load of the power unit on the front and rear engine mounts arranged at the front and rear of the vehicle is greater than a half of an overall support load of that power unit.

\* \* \* \* \*